(12) United States Patent
Lim et al.

(10) Patent No.: US 9,374,587 B2
(45) Date of Patent: *Jun. 21, 2016

(54) AREA-BASED ENCODING/DECODING DEVICE AND METHOD

(71) Applicant: SAMSUNG ELECTRONICS CO., LTD., Suwon-si, Gyeonggi-do (KR)

(72) Inventors: Il Soon Lim, Yongin-si (KR); Ho Cheon Wey, Yongin-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/799,147

(22) Filed: Jul. 14, 2015

(65) Prior Publication Data

US 2015/0319435 A1 Nov. 5, 2015

Related U.S. Application Data

(62) Division of application No. 13/574,481, filed as application No. PCT/KR2011/000455 on Jan. 21, 2011, now Pat. No. 9,124,887.

(30) Foreign Application Priority Data

Jan. 22, 2010 (KR) .................. 10-2010-0005908
Jan. 21, 2011 (KR) .................. 10-2011-0006393

(51) Int. Cl.
G06K 9/36 (2006.01)
H04N 19/117 (2014.01)
(Continued)

(52) U.S. Cl.
CPC ........... *H04N 19/117* (2014.11); *H04N 19/119* (2014.11); *H04N 19/172* (2014.11);
(Continued)

(58) Field of Classification Search
CPC . H04N 19/176; H04N 19/117; H04N 19/119; H04N 19/46; H04N 19/00; H04N 19/132; H04N 19/186; H04N 19/507; H04N 19/61; G06T 9/00; G06J 9/40
USPC ........................................... 382/233
See application file for complete search history.

(56) References Cited

U.S. PATENT DOCUMENTS 8,848,801 B2 * 9/2014 Lainema .................. 375/240.24
9,124,887 B2 * 9/2015 Lim ...................... H04N 19/176
(Continued)

FOREIGN PATENT DOCUMENTS

EP 2 109 322 10/2009
KR 10-0305485 10/2001
(Continued)

OTHER PUBLICATIONS

U.S. Appl. No. 13/574,481, filed Oct. 11, 2012, Il Soon Lim, Samsung Electronics Co., Ltd.
(Continued)

*Primary Examiner* — Ali Bayat
(74) *Attorney, Agent, or Firm* — Staas & Halsey LLP

(57) ABSTRACT

Region-based encoding apparatus and decoding apparatus. The encoding apparatus selects an optimum region division mode from region division modes with respect to regions divided from an image frame, and transmits, to the decoding apparatus, an optimum image filtering method and an optimum filter coefficient of regions divided, according to the optimum region division mode.

1 Claim, 13 Drawing Sheets

(51) Int. Cl.
  *H04N 19/172* (2014.01)
  *H04N 19/176* (2014.01)
  *H04N 19/119* (2014.01)
  *H04N 19/46* (2014.01)
  *H04N 19/174* (2014.01)
  *H04N 19/82* (2014.01)
  *H04N 19/86* (2014.01)
  *H04N 19/59* (2014.01)

(52) U.S. Cl.
  CPC ........... *H04N19/174* (2014.11); *H04N 19/176* (2014.11); *H04N 19/46* (2014.11); *H04N 19/59* (2014.11); *H04N 19/82* (2014.11); *H04N 19/86* (2014.11)

(56) References Cited

U.S. PATENT DOCUMENTS

| | | | |
|---|---|---|---|
| 2005/0200757 A1 | 9/2005 | Pica et al. | |
| 2009/0087111 A1* | 4/2009 | Noda | H04N 21/23892 382/238 |
| 2010/0046845 A1* | 2/2010 | Wedi | H04N 19/619 382/233 |
| 2011/0170609 A1 | 7/2011 | Lainema et al. | |
| 2013/0301732 A1 | 11/2013 | Hsu et al. | |

FOREIGN PATENT DOCUMENTS

| | | |
|---|---|---|
| KR | 10-0313284 | 12/2001 |
| KR | 10-0973518 | 8/2010 |
| WO | WO 2006/108654 | 10/2006 |
| WO | WO 2009/074117 | 6/2009 |

OTHER PUBLICATIONS

International Search Report of PCT/KR2011/000455 mailed Oct. 11, 2011.
Restriction Requirement dated Jun. 2, 2014 in U.S. Appl. No. 13/574,481.
Office Action dated Oct. 22, 2014 in U.S. Appl. No. 13/574,481.
Office Action dated Feb. 20, 2015 in U.S. Appl. No. 13/574,481.
Notice of Allowance dated Apr. 30, 2015 in U.S. Appl. No. 13/574,481.
U.S. Appl. No. 14/799,114, filed Jul. 14, 2015, Il Soon Lim, Samsung electronics Co., Ltd.
U.S. Appl. No. 14/799,178, filed Jul. 14, 2015, Il Soon Lim, Samsung electronics Co., Ltd.
U.S. Appl. No. 14/799,088, filed Jul. 14, 2015, Il Soon Lim, Samsung electronics Co., Ltd.
Office Action dated Sep. 24, 2015 in U.S. Appl. No. 14/799,114.
Office Action dated Sep. 22, 2015 in U.S. Appl. No. 14/799,178.
Office Action dated Sep. 22, 2015 in U.S. Appl. No. 14/799,088.
Extended European Search Report dated Nov. 24, 2015 from European Patent Application No. 11734901.9, 12 pages.
Extended European Search Report dated Nov. 24, 2015 from European Patent Application No. 15176752.2, 12 pages.
Yu Liu, "Adaptive Post/Loop Filters in JM/KTA—Part 2", Aug. 23, 2009, 3 pages total.
Wang et al., "Partition-Level Adaptive Interpolation Filter for Video Coding", IEEE International Conference on Multimedia and Expo, Jun. 28, 2009, pp. 157-160.
Watanabe et al., "In-Loop Filter Using Block-Based Filter Control for Video Coding", IEEE International Conference on Image Processing, Nov. 7, 2009, pp. 1013-1016.
Chujoh et al., "Specification and experimental results of Quadtree-based Adaptive Loop Filter", Apr. 15, 2009, XP-002675788, 11 pages total.
Fan et al., "Overview of AVS Video Standard", 2004 IEEE International Conference on Multimedia and Expo, vol. 1, Jun. 27, 2004, pp. 423-426.
Chujoh et al., "Block-based Adaptive Loop Filter (VCEG-AI18)", ITU Study Group 16—Video Coding Experts Group, Jul. 16, 2008, 6 pages total.
Tsai et al., "TE10 subtest 2: Coding Unit Synchronous Picture Quadtree-based Adaptive Loop Filter (QALF)" Joint Collaborative Team On Video Coding (JCT-VC) of ITU-T SG16 WP3 and ISO/IEC JTC1/SC29/WG11, Oct. 7-15, 2010, 12 pages total.
Notice of Allowance dated Mar. 25, 2016 from U.S. Appl. No. 14/799,114.
Notice of Allowance dated Mar. 7, 2016 from U.S. Appl. No. 14/799,178.
Notice of Allowance dated Mar. 4, 2016 from U.S. Appl. No. 14/799,088.

* cited by examiner

FIG. 5

|   | REGION DIVISION MODE |
|---|---|
| 1 | LEFT/RIGHT |
| 2 | TOP/BOTTOM |
| 3 | LEFT/MIDDLE/RIGHT |
| 4 | TOP/MIDDLE/BOTTOM |
| 5 | HORIZONTALLY-QUARTERED |
| 6 | VERTICALLY-QUARTERED |
| 7 | QUARTERED |
| 8 | CENTER/SURROUND |

AREA-BASED ENCODING/DECODING DEVICE AND METHOD

CROSS-REFERENCE TO RELATED APPLICATIONS

This application is a divisional of U.S. patent application Ser. No. 13/574,481, filed on Oct. 11, 2012, which is a U.S. National Phase application of PCT/KR2011/000455 filed Jan. 21, 2011 and claims the priority benefit of Korean Patent Application No. 10-2010-0005908, filed on Jan. 22, 2010 and Korean Patent Application No. 10-2011-0006393, filed on Jan. 21, 2011, in the Korean Intellectual Property Office, the disclosures of each of which are incorporated herein by reference.

BACKGROUND

1. Field

Example embodiments of the following description relate to an apparatus and method for encoding and decoding, and more particularly, to an apparatus and method for processing an image based on regions divided from an image frame.

2. Description of the Related Art

An image frame may include a single characteristic or several different characteristics. Conventionally, filtering has been applied to the entire image frame without considering different characteristics of the image frame.

In this case, quality of the image frame may be reduced after the filtering and excessive resources may be used. Additionally, an effect of compression of the image frame may be unsatisfactory. Accordingly, there is a need to improve an image processing result by considering respective characteristics of the image frame.

SUMMARY

According to example embodiments, there may be provided an encoding apparatus including a division mode selection unit to select an optimum region division mode from region division modes with respect to an image frame; a division mode transmission unit to transmit the selected optimum region division mode to a decoding apparatus; and a filter information transmission unit to transmit, to the decoding apparatus, an optimum image filtering method and an optimum filter coefficient for each of regions divided, according to the selected optimum region division mode.

The encoding apparatus may further include a result selection unit to select a final image processing result, based on a cost function of an image processing result obtained by filtering at least two regions divided from the image frame, according to the optimum region division mode, and based on a cost function of an image processing result obtained by not performing filtering.

According to example embodiments, there may be also provided a decoding apparatus including a division mode receiving unit to receive an optimum region division mode from an encoding apparatus; a filter information receiving unit to receive, from the encoding apparatus, an optimum image filtering method and an optimum filter coefficient of each of regions divided from an image frame, according to the optimum region division mode; and a filtering unit to perform filtering with respect to each of the regions divided from the image frame, according to the optimum region division mode, based on the optimum image filtering method and the optimum filter coefficient.

The foregoing and/or other aspects are achieved by providing an encoding method including selecting an optimum region division mode from region division modes with respect to an image frame; transmitting the selected optimum region division mode to a decoding apparatus; and transmitting, to the decoding apparatus, an optimum image filtering method and an optimum filter coefficient of each of regions divided, according to the selected optimum region division mode.

The encoding method may further include selecting a final image processing result, based on a cost function of an image processing result obtained by filtering at least two regions divided from the image frame, according to the optimum region division mode, and based on a cost function of an image processing result obtained by not performing filtering.

The foregoing and/or other aspects are achieved by providing a decoding method, including receiving an optimum region division mode from an encoding apparatus; receiving, from the encoding apparatus, an optimum image filtering method and an optimum filter coefficient of each of regions divided from an image frame, according to the optimum region division mode; and performing filtering with respect to each of the regions divided from the image frame, according to the optimum region division mode, based on the optimum image filtering method and the optimum filter coefficient.

The foregoing and/or other aspects are also achieved by providing a bit stream recorded with an optimum region division mode among region division modes with respect to an image frame, an optimum image filtering method, and an optimum filter coefficient.

According to example embodiments, since filtering is performed independently to each of divided regions of an image frame, the quality of the processed image frame may increase.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 5 illustrates a diagram showing properties of a region division mode, according to example embodiments;

DETAILED DESCRIPTION

Figure 1:
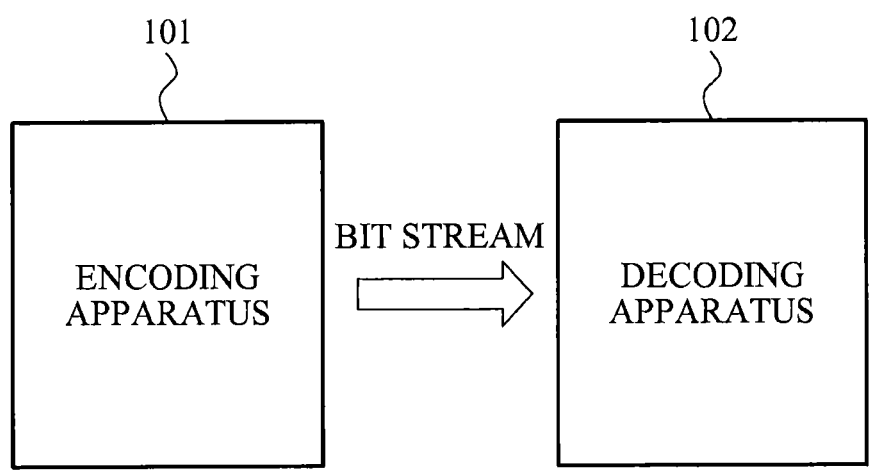
FIG. 1 illustrates a diagram for explaining operations of an encoding apparatus and a decoding apparatus, according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a diagram for explaining operations of an encoding apparatus 101 and a decoding apparatus 102, according to example embodiments.

The encoding apparatus 101 may select an optimum region division mode with respect to an image frame and transmit the optimum region division mode to the decoding apparatus 102. The image frame may have different characteristics, according to regions. According to the example embodiments, the image frame may be divided into at least two regions, to each of which a filter may be independently applied. The filter may be used for restoration or enlargement of an image. Additionally, the encoding apparatus 101 may calculate an optimum image filtering method and an optimum filter coefficient with respect to each of the regions divided, according to the optimum region division mode.

The encoding apparatus 101 may calculate cost functions with respect to image processing results of respective predetermined region division modes, and determine a region division mode having a lowest cost function as the optimum region division mode. Here, the image processing results may refer to results of performing filtering with respect to the respective regions divided, according to the optimum region division mode. When the filter is applied for image enlargement, the image processing result may be the image frame being enlarged. When the filter is applied for image restoration, the image processing result may refer to the image frame compressed and then restored to an initial state before the compression.

The encoding apparatus 101 may transmit the optimum region division mode, the optimum image filtering method of each of regions divided from the image frame according to the optimum region division mode, or the optimum filter coefficient of each of the regions, to the decoding apparatus 102 through a bit stream.

As described above, the filter is applied not to the entire image frame. That is, filtering is independently performed to each of the regions according to a region division mode that divides the image frame into at least two regions. Consequently, the image processing result of the image result may be improved.

Figure 2:
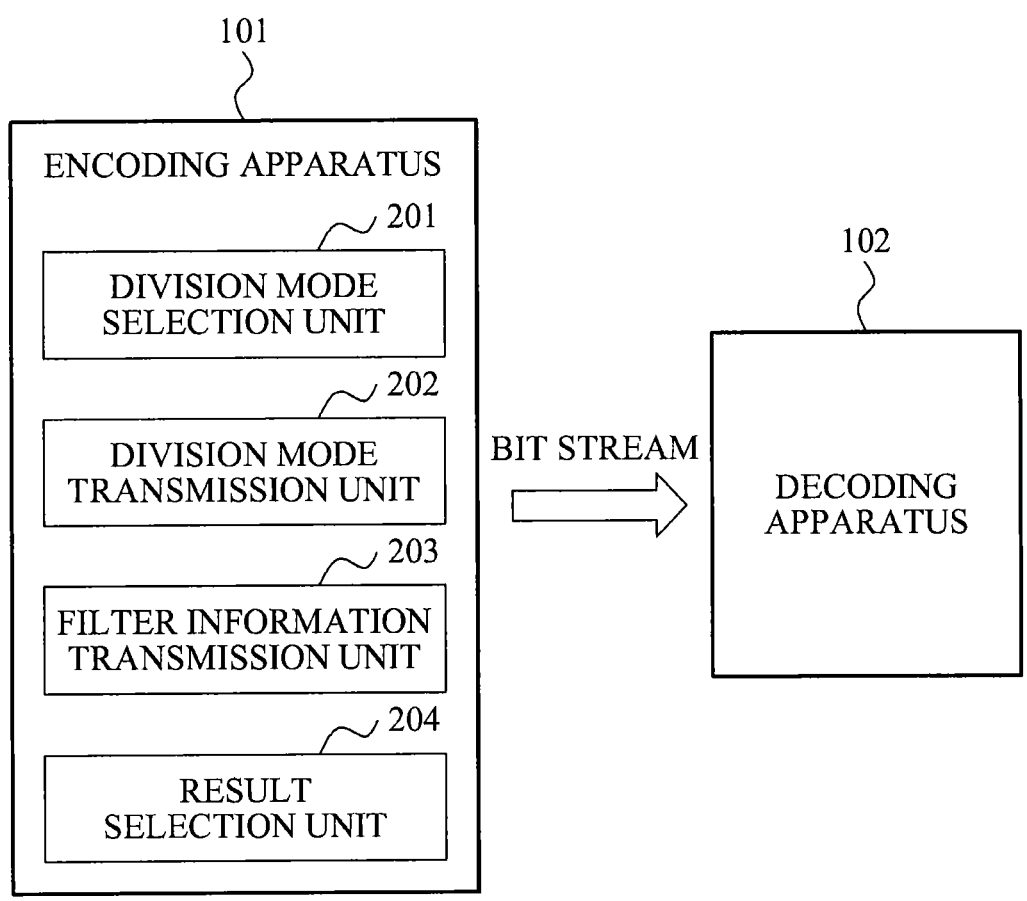
FIG. 2 illustrates a diagram showing a detailed structure of an encoding apparatus, according to example embodiments.

FIG. 2 illustrates a diagram showing a detailed structure of an encoding apparatus 101, according to example embodiments.

Referring to FIG. 2, the encoding apparatus 101 may include a division mode selection unit 201, a division mode transmission unit 202, a filter information transmission unit 203, and a result selection unit 204.

The division mode selection unit 201 may select an optimum region division mode among region division modes with respect to an image frame. A number and shape of regions divided from the image frame may be determined by the region division modes. The region division modes may be predetermined before selection of the optimum region division mode. Respective regions divided from the image frame, according to the optimum region division mode may be allocated with filter sets independently performing filtering or independently having a filter coefficient.

For example, the division mode selection unit 201 may select the optimum region division mode by calculating cost functions of the respective region division modes. In addition, the division mode selection unit 201 may determine an optimum image filtering method for each of the regions divided, according to the optimum region division mode, and calculate an optimum filter coefficient, according to the optimum image filtering method.

More specifically, the division mode selection unit 201 may calculate the optimum image filtering method and the optimum filter coefficient of each of the regions divided from the image frame, according to the region division modes, and select the optimum region division mode, based on a cost function of a filtering result applying the optimum image filtering method and the optimum filter coefficient. Accordingly, the division mode selection unit 201 may select a region division mode having a lowest cost function, among cost functions of the respective region division modes, as the optimum region division mode. Also, the division mode selection unit 201 may select the optimum image filtering method by calculating the cost functions of the respective region division modes.

For example, the division mode selection unit 201 may select the optimum region division mode from at least one of a region division mode for dividing the image frame into a left region and a right region, a region division mode for dividing the image frame into a top region and a bottom region, a region division mode for dividing the image frame into a top region, a middle region, and a bottom region vertically arranged, a region division mode for dividing the image frame into a left region, a middle region, and a right region horizontally arranged, a region division mode for dividing the image frame into at least four regions horizontally arranged, a region division mode for dividing the image frame into at least four regions vertically arranged, a region division mode for dividing the image frame into at least four regions, a region division mode for dividing the image frame into a central region and a surrounding region, and a region division mode for setting a region expanded in units of a rectangular base unit as one division region. However, since those region division modes are suggested only by way of example, the encoding apparatus 101 may apply any type of region division modes for dividing the image frame into at least two regions.

The division mode transmission unit 202 may transmit the optimum region division mode to the decoding apparatus 102. In this case, the optimum region division mode may be contained in a header of a bit stream transmitted from the encoding apparatus 101 to the decoding apparatus 102.

The filter information transmission unit 203 may transmit the optimum image filtering method and the optimum filter coefficient of each of the regions divided, according to the optimum region division mode. Here, the optimum image filtering method and the optimum filter coefficient may be contained in the header of the bit stream transmitted from the encoding apparatus 101 to the decoding apparatus 102.

The result selection unit 203 may select a final image processing result which is based on a cost function of an image processing result obtained by filtering at least two regions divided from the image frame according to the optimum region division mode and a cost function of an image processing result obtained by not performing filtering.

Here, a skip flag defining whether filtering of the final image processing is performed may be transmitted to the decoding apparatus 102. The skip flag may be contained in the header of the bit stream transmitted from the encoding apparatus 101 to the decoding apparatus 102.

Figure 3:
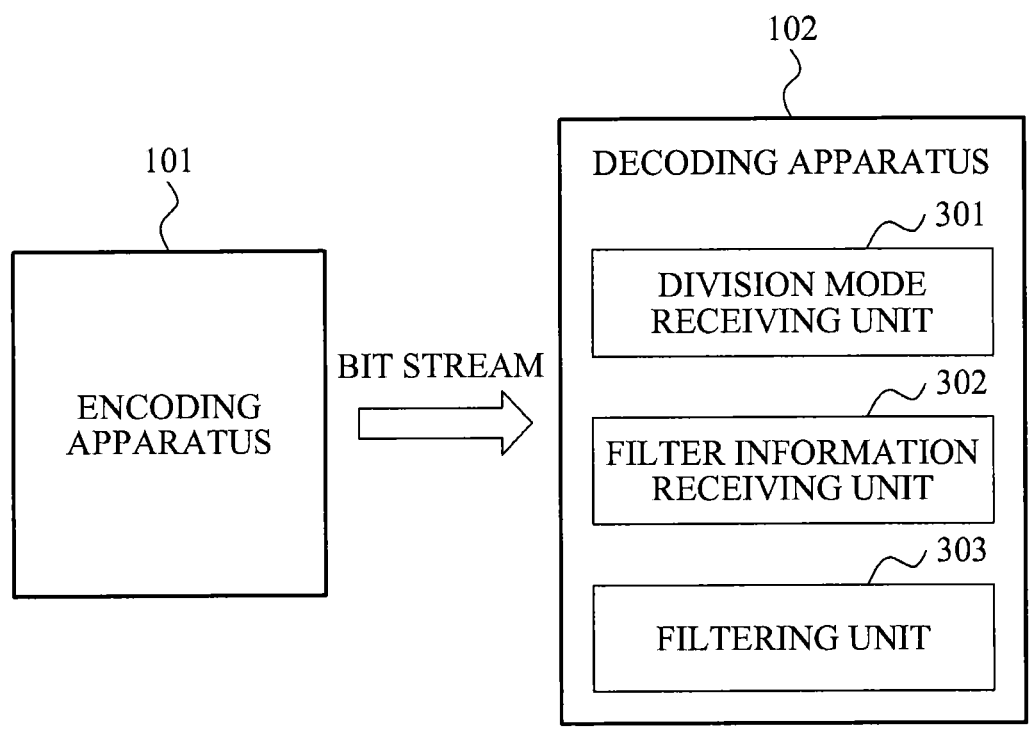
FIG. 3 illustrates a diagram showing a detailed structure of a decoding apparatus, according to example embodiments.

FIG. 3 illustrates a diagram showing a detailed structure of a decoding apparatus 102, according to example embodiments.

Referring to FIG. 3, the decoding apparatus 102 may include a division mode receiving unit 301, a filter information receiving unit 302, and a filtering unit 303.

The decoding apparatus 102 may receive the skip flag indicating whether to perform filtering with respect to the image frame, from an encoding apparatus 101. The decoding apparatus 102 may perform filtering in accordance with the skip flag, in the following manner.

The division mode receiving unit 301 may receive an optimum region division mode from the encoding apparatus 101. Specifically, the division mode receiving unit 301 may receive the optimum region division mode selected, based on cost functions of respective regions with respect to the image frame.

For example, the division mode receiving unit 301 may receive the optimum region division mode selected by the encoding apparatus 101, from at least one of a region division mode for dividing the image frame into a left region and a right region, a region division mode for dividing the image frame into a top region and a bottom region, a region division mode for dividing the image frame into a top region, a middle region, and a bottom region vertically arranged, a region division mode for dividing the image frame into a left region, a middle region, and a right region horizontally arranged, a region division mode for dividing the image frame into at least four regions horizontally arranged, a region division mode for dividing the image frame into at least four regions vertically arranged, a region division mode for dividing the image frame into at least four regions, a region division mode for dividing the image frame into a central region and a surrounding region, and a region division mode for setting a region expanded in units of a rectangular base unit as one division region. However, since those region division modes are suggested only by way of example, the encoding apparatus 101 may apply any type of region division modes for dividing the image frame into at least two regions.

For example, the encoding apparatus 101 may calculate the optimum image filtering method and the optimum filter coefficient of each of the regions divided from the image frame according to the region division modes, and select the optimum region division mode based on a cost function of a filtering result applying the optimum image filtering method and the optimum filter coefficient.

The filter information receiving unit 302 may receive the optimum image filtering method and the optimum filter coefficient of each of the regions divided, according to the optimum region division mode, from the encoding apparatus 101. For example, the filter information receiving unit 302 may receive the optimum image filtering method and the optimum filter coefficient of each of the regions divided from the image frame, according to the optimum region division mode, from the encoding apparatus 101.

The filtering unit 303 may perform filtering with respect to each of the regions of the image frame divided, according to the optimum region division mode, based on the optimum image filtering method and the optimum filter coefficient. The optimum filter coefficient is determined by the optimum image filtering method. Since each region of the image frame is independently filtered, the image processing effect may be improved.

Figure 4:
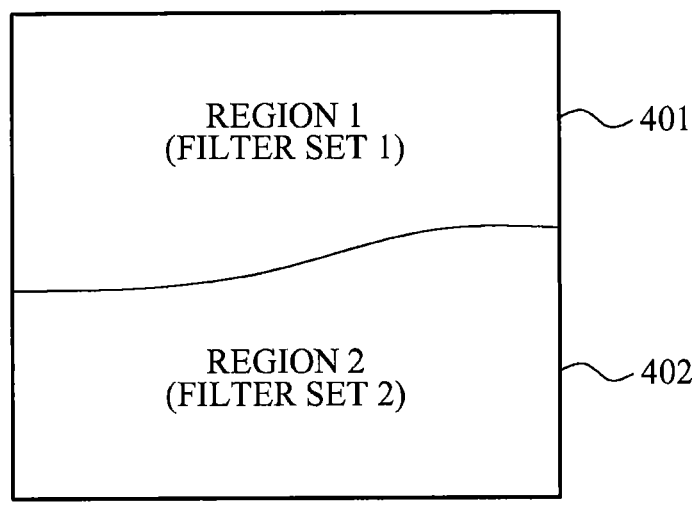
FIG. 4 illustrates a diagram explaining an image processing method based on a region, according to example embodiments.

FIG. 4 illustrates a diagram explaining an image processing method, based on a region, according to example embodiments.

As shown in FIG. 4, the image frame to be processed may be divided into at least two regions, for example, regions 401 and 402.

More specifically, respectively different filters may be applied according to the regions of the image frame. In this case, the filters may be used to enlarge the image frame or to restore a compressed image frame. Therefore, as shown in FIG. 4, filter sets applying respectively different image filtering methods or filter coefficients may be applied to the respective regions.

However, depending on embodiments, when the image frame is divided into at least three regions, at least two of which have the same image characteristic, the same filtering method or filter coefficient may be applied to the at least two regions.

According to the example embodiments, the image processing result may be improved by performing filtering independently, according to the regions in consideration of image characteristics of respective regions of the image frame.

FIG. 5 illustrates a diagram showing properties of region division modes, according to example embodiments.

FIG. 5 shows properties of the example region division modes for dividing an image frame into at least two regions. The region division mode may be predetermined before an encoding apparatus 101 selects an optimum region division, among a plurality of region division modes.

Region division modes 1, 2, and 8 divide the image frame into two regions. Region division modes 3 and 4 divide the image frame into three regions. Region division modes 5, 6, and 7 divide the image frame into four regions.

A number and shape of regions divided from the image frame may be varied according to the region division modes. When the image frame is divided into a left region and a right region, according to the region division mode 1, surface areas of the left region and the right region may be the same or different. In other words, the image frame may be divided into regions having the same or different surface area.

However, the properties of the region division modes shown in FIG. 5 are suggested only as examples. That is, the region division modes may include a region division mode dividing the image frame into at least five regions, for example.

Figure 6:
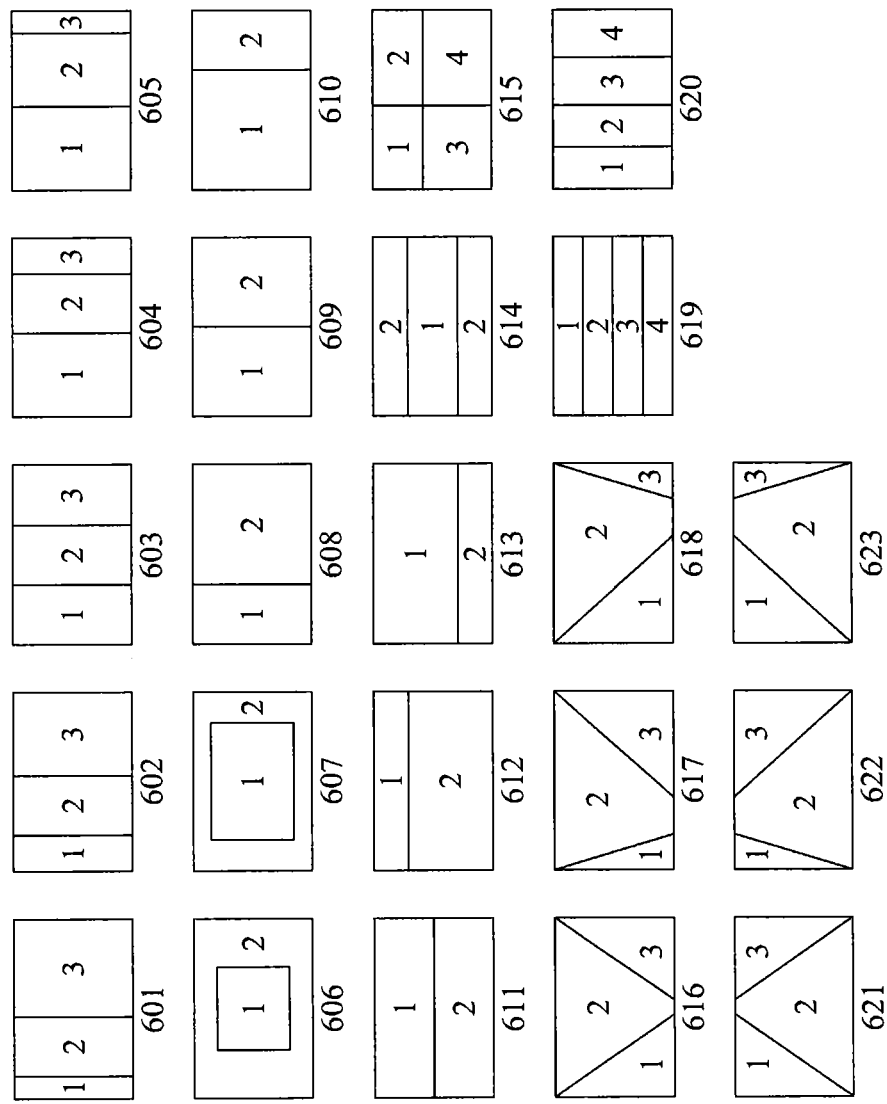
FIG. 6 illustrates a diagram showing types of region division modes, according to example embodiments.

FIG. 6 illustrates a diagram showing types of region division modes, according to example embodiments.

FIG. 6 shows image frames divided into at least two regions, according to the region division mode. However, the region division mode applied in FIG. 6 is only an example. That is, any region division mode dividing the image frame into at least two regions may be included in the scope of the example embodiments.

For example, image frames 601, 602, 603, 604, 605, 616, 617, 618, 621, 622, and 623 are divided into three regions according to the region division mode 3, explained with reference to FIG. 5, which divides the image frame into left, middle, and right regions. Image frames 606 and 607 are divided into two regions according to the region division mode 8 of FIG. 5, which divides the image frame into a central region and a surrounding region. In addition, image frames 608, 609, and 610 are divided into two regions, that is, a left region and a right region, according to the region division mode 1 of FIG. 5.

Image frames 611, 612, and 613 are divided into two regions, that is, a top region and a bottom region, according to the region division mode 2 of FIG. 5. An image frame 614 is divided into three regions, that is, a top region, a middle region, and a bottom region, according to the region division mode 4 of FIG. 5. An image frame 615 is divided into four regions according to the region division mode 7, that is, a quartered mode shown in FIG. 5. An image frame 619 is divided into four regions, according to the region division mode 6, that is, a vertically-quartered mode shown in FIG. 5. An image frame 620 is divided into four regions, according to the region division mode 5, that is, a horizontally-quartered mode shown in FIG. 5.

The encoding apparatus 101 may select the optimum region division mode by considering cost functions of filtering results with respect to the respective regions divided according to the region division modes as shown in FIG. 6. Since each of a plurality of image frames, constituting an input image, has different characteristics, optimum region division modes for the plurality of image frames may be respectively different. A number and shape of the regions divided from each image frame may also be different, according to the region division modes.

Figure 7A:
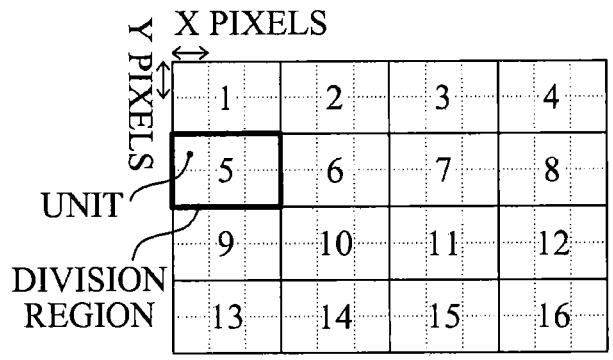
FIGS. 7A through 7C illustrate a diagram showing an example where an image frame is divided into a plurality of regions, according to example embodiments.
Figure 7B:
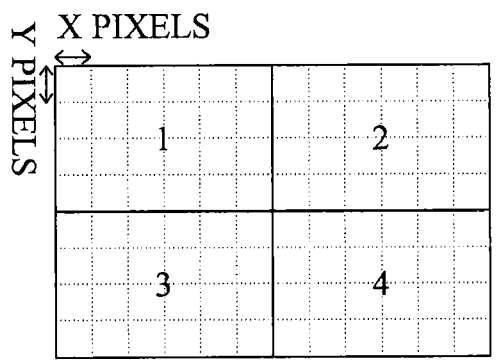
Figure 7C:
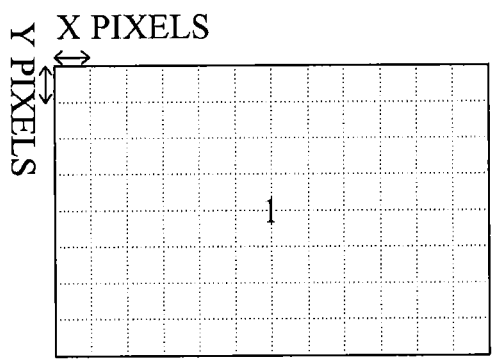

FIGS. 7A through 7C illustrate a diagram showing an example where an image frame is divided into a plurality of regions, according to example embodiments.

FIGS. 7A through 7C show one of region division modes, wherein a base unit is a rectangle consisting of x-number of pixels in a row by y-number of pixels in a column. That is, a region expanded in units of the base unit may be set as one division region. One image frame may consist of at least one division region.

The image frame may be divided into a plurality of division regions, each of which may consist of a multiple of a base unit. The base unit may be a rectangle consisting of x-number of pixels in a row by y-number of pixels in a column. FIG. 7A shows an example where one division region consists of two base units in a column by three base units in a row. FIG. 7B shows an example where one division region consists of four base units in a column by six base units in a row. FIG. 7C shows an example where one division region consists of eight base units in a column by twelve base units in a row. Also, a region division mode dividing the division region into a multiple of the base unit may be included in the region division modes, according to the example embodiments.

Figure 8:
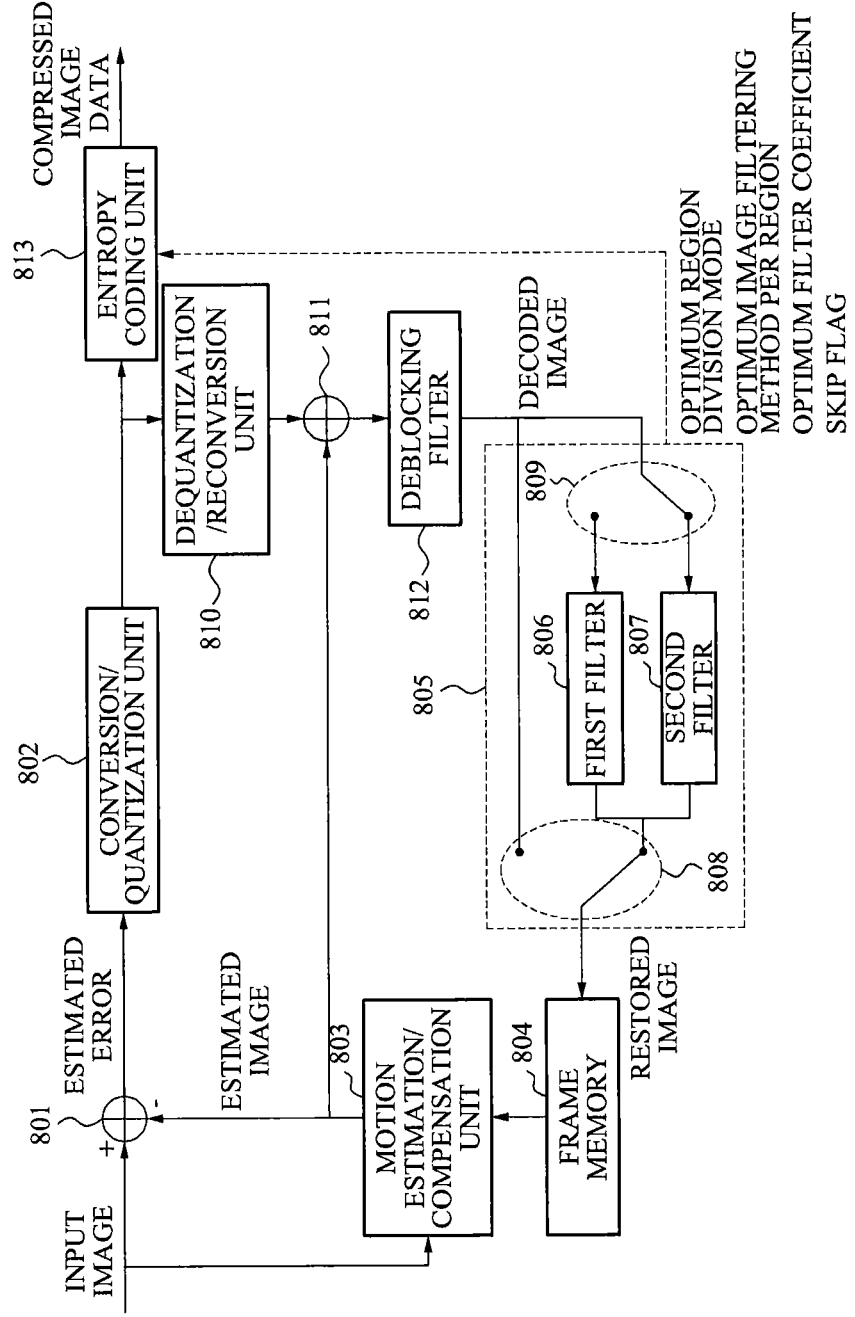
FIG. 8 illustrates a diagram showing an example where an encoding apparatus is applied, according to example embodiments.

FIG. 8 illustrates a diagram showing an example where an encoding apparatus is applied, according to example embodiments.

For example, the encoding apparatus 101 shown in FIG. 2 may correspond to a loop filter 805 of FIG. 8. The loop filter 805 of FIG. 8 may be used to restore a compressed image frame to an initial state of before the compression. Specifically, the loop filter 805 may be applied when two filters are applied to the division region of the image frame. However, FIG. 8 illustrates only an example case and the encoding apparatus 101 of FIG. 2 may be used to enlarge the image frame.

Referring to FIG. 8, the encoding apparatus 101 may include a first composition unit 801, a conversion/quantization unit 802, a motion estimation/compensation unit 803, a frame memory 804, the loop filter 805, a first filter 806, a second filter 807, a skip determination unit 808, a division mode selection unit 809, a dequantization/reconversion unit 810, a second composition unit 811, a deblocking filter 812, and an entropy coding unit 813.

The encoding apparatus of FIG. 8 may compress an estimated error between an input image and an estimated image using an estimation process, and supply the compressed estimated error to a decoding apparatus. The motion estimation/compensation unit 803 may generate the estimated image using the input image and a restored image stored in the frame memory 804.

In this case, the restored image refers to a temporally previous image with respect to the input image. The first composite unit 801 calculates the estimated error using the input image and the estimated image. The conversion/quantization unit 802 converts and quantizes the estimated error. The dequantization/reconversion unit 810 dequantizes and reconverts the quantized estimated error.

The second composition unit 811 composes the estimated image and the estimated error being dequantized and reconverted. The deblocking filter 812 is applied to a composition result of the estimated image and the estimated error, thereby generating a decoded image. The deblocking filter 812 may remove a block artifact from the composition result of the estimated error and the estimated image.

The loop filter 805 may selectively apply one of the first filter 805, the second filter 807, and further filters, for example, an N-th filter, according to regions through the division mode selection unit 809. The division mode selection unit 809 may select an optimum region division mode, among the plurality of region division modes, and select one of the regions divided according to the optimum region division mode. As aforementioned, the optimum region division mode refers to a region division mode having a lowest cost function among the plurality of region division modes. In addition, the division mode selection unit 809 may determine an optimum image filtering method or calculate an optimum filter coefficient with respect to each of the regions divided, according to the optimum region division mode.

The skip determination unit 808 may determine an image having a relatively low cost function between the decoded image and a filtered image, filtered by the first filter 806 and a second filter 807, as the restored image. When the filtered image filtered by the first filter 806, the second filter 807, and further filters, such as, the N-th filter, is determined as the restored image, a skip mode is in an off state. When the decoded image is determined as the restored image, the skip mode is in an on state. In other words, the skip mode indicates whether to use the filtered image filtered by the first filter 806, the second filter 807, and further filters, such as, the N-th filter. The skip mode may be transmitted to the decoding apparatus in the form of flag information contained in a header.

The loop filter 805 may derive the optimum region division mode, and an image filtering method or a filter coefficient of each of the regions divided, according to the optimum region division mode. For example, the image filtering method may include winner filtering, smoothing filtering, and offset readjustment. The filter coefficient may be calculated with reference to the decoded image and the input image. For example, the filter coefficient may be calculated by a winner equation, that is, Equation 1 below.

$$0 = \sum_x \sum_y \left( S_{x,y} - \sum_{i=1}^{w} \sum_{j=1}^{w} h_{i,j} P_{x+i, y+j} \right) P_{x+k, y+l} \quad \text{Equation 1}$$

$$\forall k, l \in \{0, 1, \ldots, w-1\}$$

In Equation 1, S denotes the input image and P denotes the decoded image. The winner equation is a linear equation that minimizes a mean of squared error (MSE) between the input image and the decoded image. A filter coefficient 'h' in the linear equation may be determined by a linear equation solution, such as, Gaussian elimination. The filter coefficient may be selected, such that the decoded image is most approximate to the input image.

The entropy coding unit 813 may code the optimum region division mode, the optimum filter coefficient, the optimum image filtering method of the respective regions, and the skip flag, and transmit the coded data to the decoding apparatus, along with compressed image data. Here, the optimum filter coefficient and the optimum image filtering method may be applied to each of the regions divided, according to the optimum region division mode.

Figure 9:
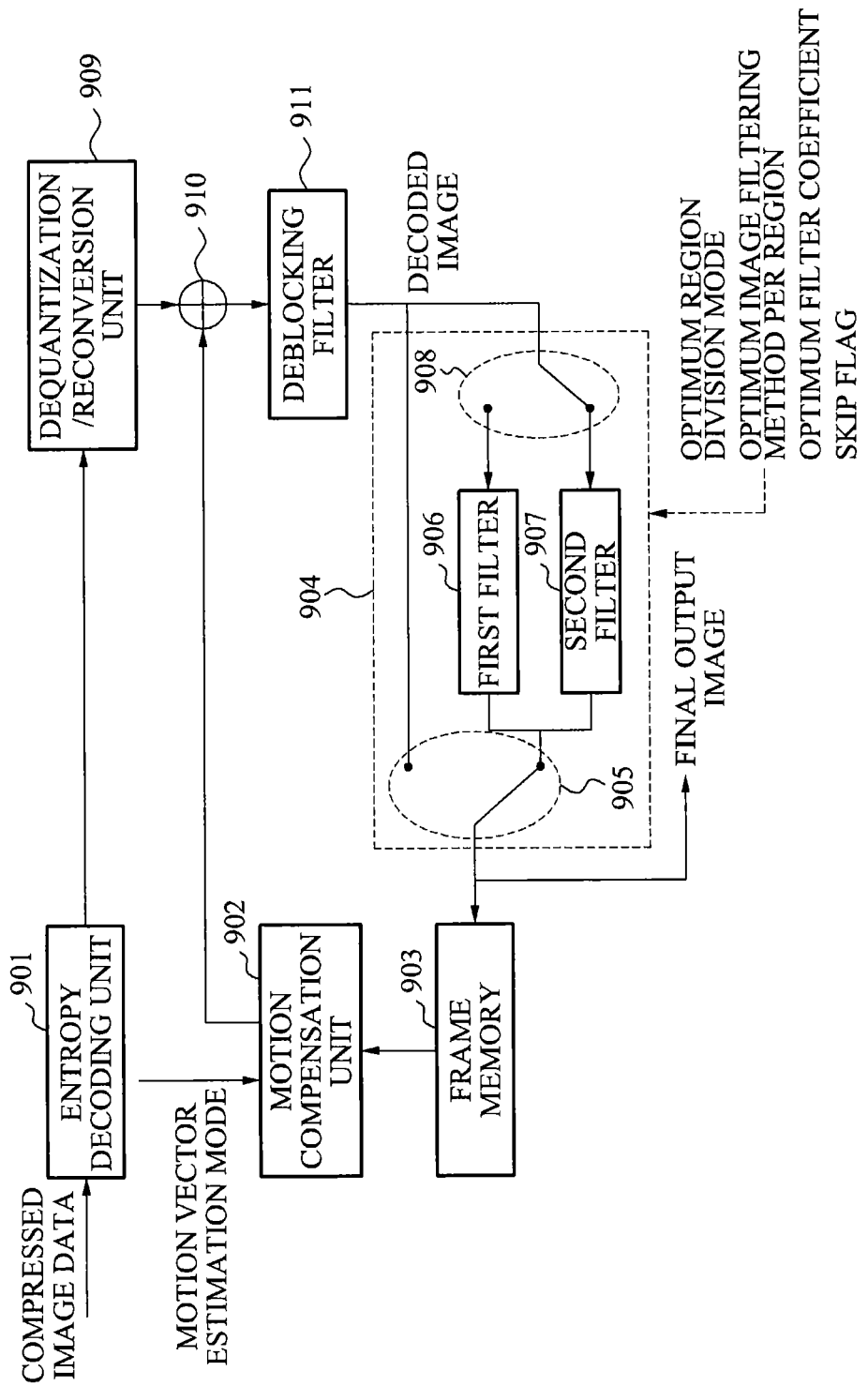
FIG. 9 illustrates a diagram showing an example where a decoding apparatus is applied, according to example embodiments.

FIG. 9 illustrates a diagram showing an example where a decoding apparatus is applied, according to example embodiments.

For example, the decoding apparatus 102 of FIG. 3 may correspond to a loop filter 904 of FIG. 9. The loop filter 904 of FIG. 9 may be used to restore a compressed image frame to an initial state of before the compression. Specifically, the loop filter 904 of FIG. 9 may be applied when two filters are applied to the division region of the image frame. However, FIG. 9 illustrates only an example case and the decoding apparatus 102 of FIG. 3 may be used to enlarge the image frame.

Referring to FIG. 9, the decoding apparatus 102 may include an entropy decoding unit 901, a motion compensation unit 902, a frame memory 903, the loop filter 904, a skip selection unit 905, a first filter 906, a second filter 907, a division mode selection unit 908, a dequantization/reconversion unit 909, an addition unit 910, and a deblocking filter 911.

The entropy decoding unit 901 may decode compressed image data received from the decoding apparatus. An estimated mode of a motion vector is extracted as a result of the decoding. The dequantization/reconversion unit 909 may dequantize and reconvert the decoded compressed image data. The motion compensation unit 902 may generate a motion vector related to the present time, based on an output image of before the compressed image data is stored in the frame memory 903 and the estimated mode of the motion vector, and transmit the motion vector to the adding unit 910. The adding unit 910 may generate the decoded image by applying the motion vector to the reconverted image data. The deblocking filter 911 may be applied to the decoded image.

The division mode selection unit 908 may select the optimum region division mode with respect to the decoded image being input. The optimum region division mode may be transmitted from the encoding apparatus. The regions divided, according to the optimum region division mode, may be filtered by the first filter 906, the second filter 907, and further filters, for example, an N-th filter. The optimum image filtering method for each of the regions may be transmitted by the decoding apparatus. The skip selection unit 905 may calculate cost functions of an output image, which is filtered and an output image, which is the non-filtered decoded image, thereby determining a final output image, according to a skip flag additionally transmitted.

Figure 10:
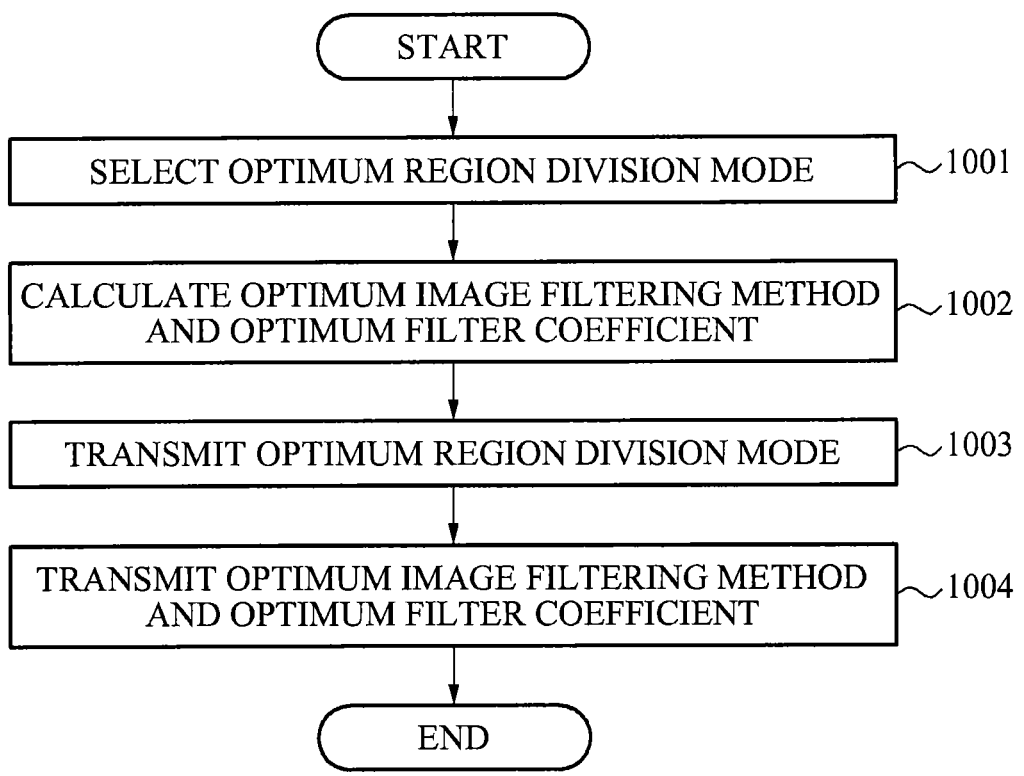
FIG. 10 illustrates a flowchart showing an encoding method, according to example embodiments.

FIG. 10 illustrates a flowchart showing an encoding method according to example embodiments.

In operation 1001, an encoding apparatus 101 may select an optimum region division mode, among region division modes with respect to an image frame. In this case, a number and shape of regions, divided from the image frame, may be determined by the region division modes. For example, the encoding apparatus 101 may select the optimum region division mode by calculating cost functions of the respective region division modes. More specifically, the encoding apparatus 101 may select a region division mode having a lowest cost function among cost functions of the respective region division modes, as the optimum region division mode.

As an example, the encoding apparatus 101 may select the optimum region division mode, from at least one of a region division mode for dividing the image frame into a left region and a right region, a region division mode for dividing the image frame into a top region and a bottom region, a region division mode for dividing the image frame into a top region, a middle region, and a bottom region vertically arranged, a region division mode for dividing the image frame into a left region, a middle region, and a right region horizontally arranged, a region division mode for dividing the image frame into at least four regions horizontally arranged, a region division mode for dividing the image frame into at least four regions vertically arranged, a region division mode for dividing the image frame into at least four regions, a region division mode for dividing the image frame into a central region and a surrounding region, and a region division mode for setting a region expanded in units of a rectangular base unit as one division region.

In operation 1002, the encoding apparatus 101 may calculate an optimum image filtering method and an optimum filter coefficient of each of the regions divided, according to the optimum region division mode. The encoding apparatus 101 may determine the optimum image filtering method, according to the optimum region division mode, and calculate the optimum filter coefficient, according to the optimum image filtering method.

In operation 1003, the encoding apparatus 101 may transmit the selected optimum region division mode to the decoding apparatus 102. For example, an index of the optimum region division mode may be included in a header of a bit stream to be transmitted to the decoding apparatus 102.

As another example, the encoding apparatus 101 may transmit the index corresponding to a horizontal length and a vertical length of an optimum division region, the horizontal length, or the vertical length, the index included in the header of the bit stream to the decoding apparatus 102.

In operation 1004, the encoding apparatus 101 may transmit the optimum image filtering method and the optimum filter coefficient of each of the regions divided, according to the optimum region division mode, to the decoding apparatus 102. For example, the encoding apparatus 101 may transmit the optimum image filtering method and the optimum filter coefficient included in the header of the bit stream.

In addition, the encoding apparatus 101 may transmit, to the decoding apparatus 102, a skip flag indicating whether to perform filtering with respect to the image frame by dividing the image frame into regions.

Figure 11:
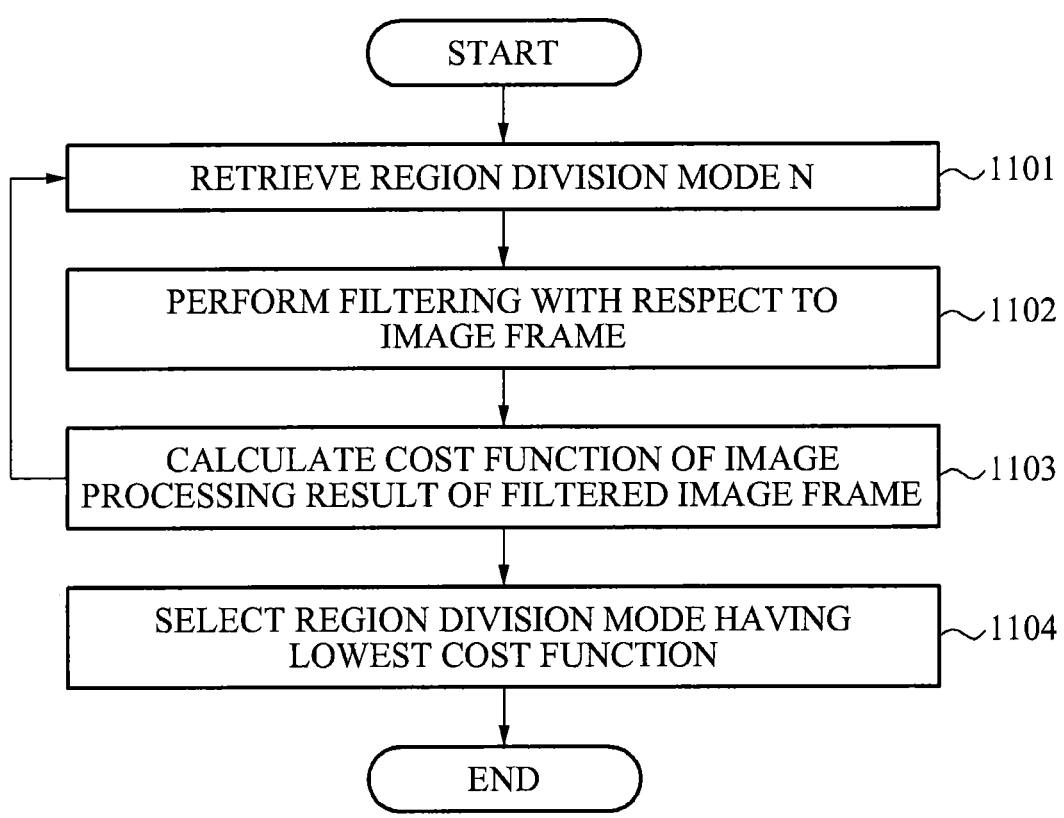
FIG. 11 illustrates a flowchart showing procedures of selecting a region division mode, according to example embodiments.

FIG. 11 illustrates a flowchart showing procedures of selecting a region division mode, according to example embodiments.

In operation 1101, an encoding apparatus 101 may retrieve a region division mode N. The region division mode N may be plural and predetermined.

In operation 1102, the encoding apparatus 101 may perform filtering with respect to each of the regions divided from the image frame, according to the region division mode N. A filter used herein may restore the image frame in a compressed state or enlarge the image frame.

In operation 1103, the encoding apparatus 101 may calculate a cost function of a filtering result. The cost function may include a rate-distortion cost (RD cost), a sum of square difference (SSD), a sum of absolute difference (SAD), a mean of squared error (MSE), a mean of absolute difference (MAD), and a distortion cost.

Operations 1101 to 1103 may be all applied to the predetermined region division mode N.

In operation 1104, the encoding apparatus 101 may select a region division mode having a lowest cost function from cost functions of a plurality of the region division modes N, as the optimum region division mode.

Figure 12:
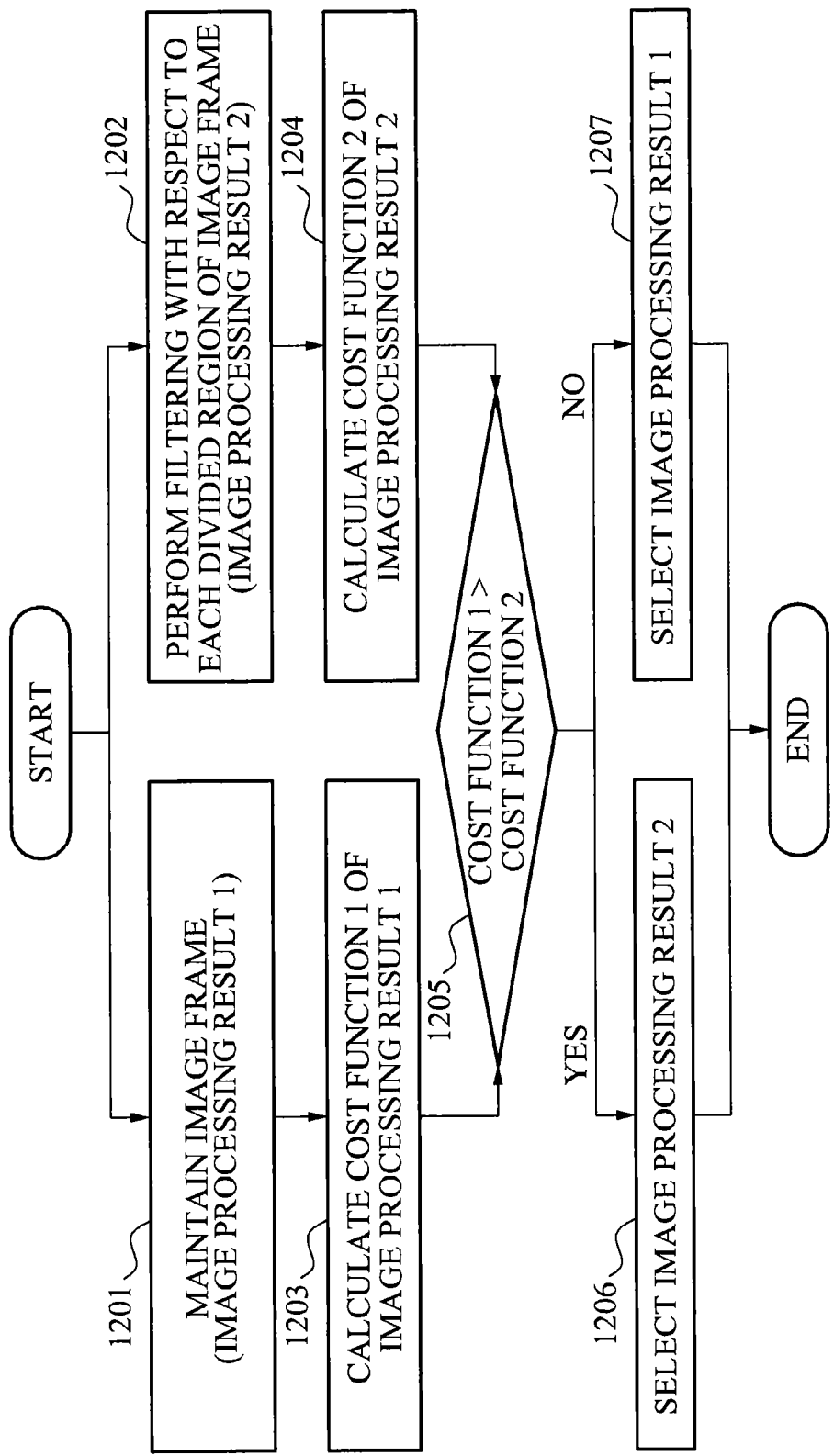
FIG. 12 illustrates a diagram showing procedures of selecting a filtering result, according to example embodiments.

FIG. 12 illustrates a diagram showing procedures of selecting a filtering result, according to example embodiments.

In operation 1201, a decoding apparatus 102 may not perform filtering with respect to an image frame, accordingly deriving an image processing result 1.

In operation 1202, the decoding apparatus 102 may perform filtering with respect to each of regions divided from the image frame. The divided regions may be determined by an optimum region division mode. Filtering of operation 1202 derives an image processing result 2.

In operation 1203, the decoding apparatus 102 may calculate a cost function 1 of the image processing result 1. In addition, the decoding apparatus 102 may calculate a cost function 2 of the image processing result 2.

In operation 1205, the decoding apparatus 102 may determine whether the cost function 1 is greater than the cost function 2. When the cost function 1 is greater than the cost function 2, the decoding apparatus 102 may select the image processing result 2. When the cost function 1 is smaller than the cost function 2, the decoding apparatus 102 may select the image processing result 1.

Figure 13:
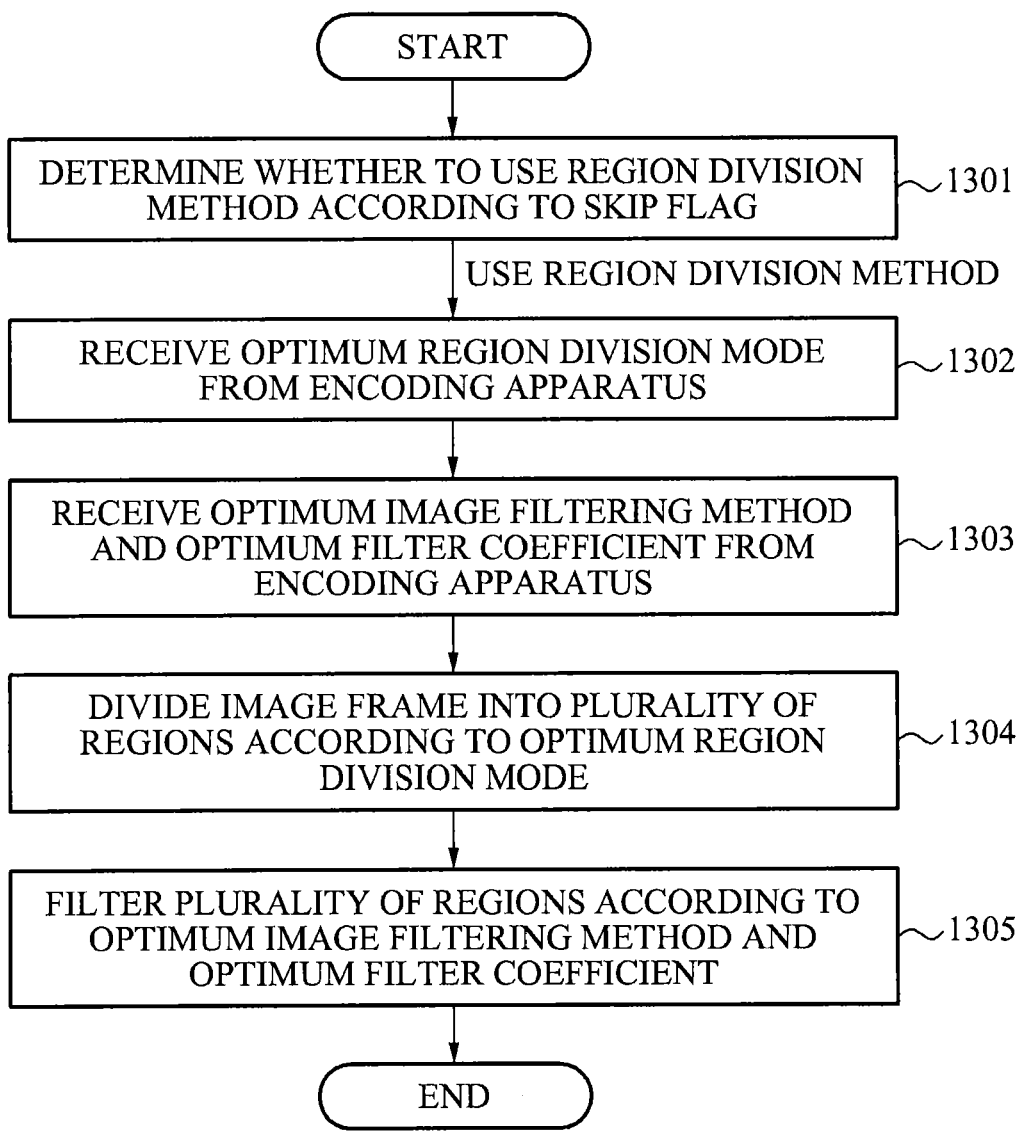
FIG. 13 illustrates a flowchart showing a decoding method, according to example embodiments.

FIG. 13 illustrates a flowchart showing a decoding method, according to example embodiments.

In operation 1301, the decoding apparatus 102 may receive a skip flag from an encoding apparatus 101. The skip flag indicates whether to perform filtering, according to a region division mode. In addition, the decoding apparatus 102 may determine whether to perform filtering, according to the region division mode, using the skip flag. That is, according to the transmitted skip flag, the decoding apparatus 102 may output a filtered image obtained by filtering regions divided from an image frame, according to an optimum region division mode, or output a non-filtered image, that is, a decoded image. Operations 1302 to 1305 illustrate procedures of filtering the regions, according to the region division mode.

In operation 1302, the decoding apparatus 102 may receive the optimum region division mode from the encoding apparatus 101.

For example, the decoding apparatus 102 may receive the optimum region division mode, selected based on cost functions of region division modes, with respect to the image frame. In this case, the encoding apparatus 101 may calculate an optimum image filtering method and an optimum filter coefficient for each of the regions divided from the image frame, according to the region division modes, and select the optimum region division mode, based on the cost functions, with respect to results of applying the optimum image filtering method and the optimum filter coefficient.

More specifically, as an example, the encoding apparatus 101 may select the optimum region division mode from at least one of a region division mode for dividing the image frame into a left region and a right region, a region division mode for dividing the image frame into a top region and a bottom region, a region division mode for dividing the image frame into a top region, a middle region, and a bottom region vertically arranged, a region division mode for dividing the image frame into a left region, a middle region, and a right region horizontally arranged, a region division mode for dividing the image frame into at least four regions horizontally arranged, a region division mode for dividing the image frame into at least four regions vertically arranged, a region division mode for dividing the image frame into at least four regions, a region division mode for dividing the image frame into a central region and a surrounding region, and a region division mode for setting a region expanded in units of a rectangular base unit as one division region.

In operation 1303, the decoding apparatus 102 may receive the optimum image filtering method and the optimum filter coefficient of each of the regions divided from the image frame according to the optimum region division mode. The optimum filter coefficient may be determined by the optimum image filtering method, with respect to each of the regions divided, according to the optimum region division mode.

In operation 1304, the decoding apparatus 102 may divide the image frame into at least two regions, according to the optimum region division mode.

In operation 1305, the decoding apparatus 102 may perform filtering with respect to each of the regions divided according to the optimum region division mode. For example, the decoding apparatus 102 may perform filtering based on the optimum image filtering method or the optimum filter coefficient of each of the regions divided according to the optimum region division mode.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the encoding apparatus and the decoding apparatus may each include at least one processor to execute at least one of the above-described units and methods.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A decoding apparatus, comprising:
    a processor configured to:
        identify a plurality of regions configuring a plurality of base units, with respect to an image;
        identify a filter type and a filter value for each of a plurality of regions; and
        perform filtering for each of the plurality of regions using the filter type and filter value, wherein the processor performs filtering for each of the plurality of regions in a loop-filter of the decoding apparatus after completion of deblocking filtering with respect to the image.

* * * * *